(12) United States Patent
Lecomte et al.

(10) Patent No.: US 10,155,684 B2
(45) Date of Patent: Dec. 18, 2018

(54) GLASS-CERAMIC ARTICLE AND ENAMEL FOR THE COATING THEREOF

(71) Applicant: EUROKERA S.N.C., Chateau Thierry (FR)

(72) Inventors: Emmanuel Lecomte, Nesles la Montagne (FR); Pablo Vilato, Paris (FR)

(73) Assignee: EUROKERA S.N.C., Chateau Thierry (FR)

( * ) Notice: Subject to any disclaimer, the term of this patent is extended or adjusted under 35 U.S.C. 154(b) by 126 days.

(21) Appl. No.: 15/029,979

(22) PCT Filed: Oct. 15, 2014

(86) PCT No.: PCT/FR2014/052630
§ 371 (c)(1),
(2) Date: Apr. 15, 2016

(87) PCT Pub. No.: WO2015/055953
PCT Pub. Date: Apr. 23, 2015

(65) Prior Publication Data
US 2016/0244356 A1 Aug. 25, 2016

(30) Foreign Application Priority Data

Oct. 18, 2013 (FR) ..................... 13 60184

(51) Int. Cl.
| | |
|---|---|
| *H05B 1/02* | (2006.01) |
| *C03C 10/00* | (2006.01) |
| *C03C 3/093* | (2006.01) |
| *C03C 8/04* | (2006.01) |
| *C03C 8/14* | (2006.01) |
| *C03C 17/04* | (2006.01) |
| *C04B 41/50* | (2006.01) |

(52) U.S. Cl.
CPC .......... *C03C 10/0009* (2013.01); *C03C 3/093* (2013.01); *C03C 8/04* (2013.01); *C03C 8/14* (2013.01); *C03C 10/00* (2013.01); *C03C 17/04* (2013.01); *C04B 41/5023* (2013.01); *H05B 1/0266* (2013.01)

(58) Field of Classification Search
CPC ....... C03C 10/0009; C03C 3/093; C03C 8/04; C03C 8/14; C03C 10/00; C03C 17/04; C04B 41/5023; H05B 1/02; H05B 1/0266
USPC ......................... 219/553, 494, 504
See application file for complete search history.

(56) References Cited

U.S. PATENT DOCUMENTS

| | | | |
|---|---|---|---|
| 6,043,171 A | 3/2000 | Siebers et al. | |
| 6,525,300 B1* | 2/2003 | Mitra | C03C 8/02 219/443.1 |
| 8,709,148 B2* | 4/2014 | Trummer | C03C 12/00 106/31.6 |
| 9,240,568 B2* | 1/2016 | Beall | H01L 51/5268 |
| 2008/0090034 A1* | 4/2008 | Harrison | B41M 5/385 428/32.71 |
| 2016/0194764 A1* | 7/2016 | Patel | C23D 5/04 427/591 |

FOREIGN PATENT DOCUMENTS

| | | |
|---|---|---|
| EP | 0 879 801 A1 | 11/1998 |
| GB | 1 329 609 | 9/1973 |
| GB | 2 263 478 A | 7/1993 |
| JP | 4-338131 A | 11/1992 |

OTHER PUBLICATIONS

International Search Report dated Feb. 2, 2015 in PCT/FR14/052630 filed Oct. 15, 2014.

* cited by examiner

*Primary Examiner* — Mark Paschall
(74) *Attorney, Agent, or Firm* — Oblon, McClelland, Maier & Neustadt, L.L.P.

(57) ABSTRACT

A glass-ceramic article is at least partly coated with at least one layer of enamel, including a glass frit. The frit includes, expressed by weight, $SiO_2$, 45-60%; $Al_2O_3$, 12-22%; $B_2O_3$, 12-22%; $Li_2O$, 0-5%; $Na_2O$, 0-2%; $K_2O$, >2%; CaO, 0-4%; MgO, 0-4%; ZnO, 0-4%; BaO, 0-4%; $ZrO_2$, 0-4%; and $TiO_2$, 0-1%. The sum of oxides CaO+MgO+BaO+SrO+ZnO is at most 10%, preferably from 2 to 8%. A process can be used to obtain the article.

17 Claims, No Drawings

GLASS-CERAMIC ARTICLE AND ENAMEL FOR THE COATING THEREOF

CROSS REFERENCE TO RELATED APPLICATION

This application is a National Stage entry under 35 USC 371 of PCT/FR2014/052630, filed on Oct. 15, 2014, and claims priority to French Patent Application No. 1360184, filed on Oct. 18, 2013, both of which are incorporated herein by reference.

The present invention relates to an article made of glass-ceramic (also referred to as "glass-ceramic article") intended, for example, for covering or receiving heating elements (such as for example a hotplate, an oven door, a fireplace insert, or a fire screen, etc.), to a process for obtaining said article, and to a novel enamel composition suitable for the coating thereof. The expression "glass-ceramic article" is understood to mean an article based on a substrate made of glass-ceramic, said substrate being, where appropriate, provided with coating(s) or with additional (decorative or functional) accessories or elements required for the final use thereof, it being possible for the article to just as easily denote the glass-ceramic substrate alone or provided with coatings (for example a decorated glass-ceramic hotplate alone for subsequent assembly by an equipment manufacturer) or that provided with additional equipment (for example a hotplate provided also with its control panel, its heating elements, etc.). The expression "enamel composition suitable for the coating thereof" is understood mainly to mean "suitable for the coating of the glass-ceramic substrate forming the article".

There are several glass-ceramic products in common use, in particular glass-ceramic hotplates are very successful among household appliance vendors, household electric appliance manufacturers and users. This success is explained in particular by the attractive appearance of these plates and by the ease of cleaning them.

A glass-ceramic is originally a glass, called precursor glass (or mother glass or green glass), the specific chemical composition of which allows controlled crystallization to be induced by suitable heat treatments, called ceramization. This partly crystallized specific structure gives the glass-ceramic unique properties.

At the present time, there are various types of glass-ceramic plate, each variant being the result of specific studies and many tests, given that it is very difficult to make modifications to these plates and/or to the process for obtaining them without risking an unfavorable effect on the desired properties. In particular, to be able to be used as a hotplate, a glass-ceramic plate must generally have a transmission in the wavelengths of the visible range that is both low enough to mask at least some of the underlying heating elements when not in use and high enough so that, depending on the case (radiant heating, induction heating, etc.), the user can, for the sake of safety, visually detect the heating elements when they are turned on and/or can, where appropriate, read the displays. It must also have a high transmission in the wavelengths of the infrared range, especially in the case of plates with radiant burners. The glass-ceramic plates must also have a sufficient mechanical strength as demanded in their field of use. In particular, in order to be able to be used as hotplates in the field of household electrical appliances, the glass-ceramic plates must have sufficient resistance (as defined for example in accordance with the EN 60335-2-6 standard), in particular to the pressure and to the shocks that may arise (support and dropping of utensils, etc.), etc.

The most common current hotplates are of dark color, in particular of black color, but there are also plates of lighter appearance (in particular of the white color having, for example, a haze of at least 50%, as described in patent FR 2 766 816), or even transparent plates provided with opacifying coatings.

Among the known (functional and/or decorative) coatings for glass-ceramic plates, there are conventionally enamels, based on glass frit and pigments, and certain paints resistant to high temperature, for example based on silicone resins (in particular based on silicone alkyd resins, etc.). In particular, enamels have the advantage of being able to be deposited on the precursor glass (or mother glass or green glass) before ceramization and of being able to be fired during the ceramization, and also have the advantage of being able to withstand high temperatures (allowing the use of various heating means for the plate). However, they may locally decrease the mechanical strength of the glass-ceramic plates and may flake off, especially for thick deposits or deposits made in several passes, certain intense colors additionally being difficult to obtain (especially in a single pass), the firing of the enamels often giving rise to the appearance of undesired hues (for example browns or grays for black enamels). In particular, it is difficult to obtain an intense black or white decoration, without unwanted hues, at the surface of the glass-ceramics, using conventional enamels.

As regards paint, this may be applied as several layers if necessary and may have various colours; however, it must be applied after ceramization, and therefore requires an additional firing operation, and it remains limited to plates for induction burners (that operate at lower temperature).

Coatings based on reflective layers also exist, which make it possible in particular to obtain, by juxtaposition with layers of enamel or of paint, matt/shiny contrast effects that are particularly desired for esthetic and functional reasons (these contrasts in particular enabling delimitations of areas), however these coatings are more expensive since they require a specific installation and are generally limited to plates for induction burners, and their manufacture, carried out subsequently after ceramization, is more complex or tricky.

The existing coatings have also been developed for the most common glass-ceramic plates to date, these plates being referred to as "arsenic refined" plates (i.e. obtained from a mother glass comprising arsenic oxide at contents, for example, of the order of 0.5% to 1.5% by weight). However, new formulations of glass-ceramic substrates have recently been developed to allow refining without arsenic (with in particular an arsenic oxide content of zero or of less than 0.1%), this leading to a modification of the interaction with the possible coatings, in particular with the fired enamel, and also necessitating the development of novel solutions or coatings that are suitable for all these substrates irrespective of the refining agent of their mother glass.

The objective of the present invention was to provide novel glass-ceramic articles (in particular novel glass-ceramic plates intended for example to cover or receive heating elements such as hotplates) broadening the range of existing products by developing a coating suitable for any type of glass-ceramic (in particular refined with arsenic or without arsenic), this coating making it possible to economically, simply and efficiently obtain color effects or renderings that are unusual or difficult or complex to obtain to date (intense and/or contrast colors, etc.), especially for functional purposes, in particular for differentiating areas, and/or for esthetic purposes, while embrittling the glass-ceramic as little as possible, this coating moreover having a good resistance (in particular mechanical strength, thermal resistance and/or abrasion resistance) and a good durability on the coated article obtained.

The present invention thus relates to a novel glass-ceramic article (or substrate or product), such as a plate, and to a novel enamel for glass-ceramics, said article being at least partly coated with at least one layer of said enamel, this enamel comprising a (or being formed of a or from a) glass frit having the following composition (expressed as weight percentages of oxides, the constituents commonly being in this form in the enamel compositions):

$SiO_2$ 45-60% (i.e. 45 to 60%), preferably 50-58%
$Al_2O_3$ 12-22%, preferably 15-19%
$B_2O_3$ 12-22%, preferably 15-19%
$Li_2O$ 0-5%, preferably >0-5%
$Na_2O$ 0-2%
$K_2O$ >2%
CaO 0-4%, preferably 0-2%
MgO 0-4%, preferably >0-4%
ZnO 0-4%, preferably >0-4%
BaO 0-4%, preferably >0-4%
$ZrO_2$ 0-4%, preferably 0-2%, in particular >0-2%
$TiO_2$ 0-1%, preferably 0-0.5% the sum of the oxides CaO+MgO+BaO+SrO+ZnO moreover being less than or equal to 10%, and preferably being from 2 to 8%.

The present invention also relates to the frit (glass particles) having the composition defined above, that makes it possible to produce the improved enamel and article according to the invention, to the enamel thus produced, having a composition that (initially) contains said frit, in particular the enamel in its form obtained by firing of said composition, and to the glass-ceramic article coated (in particular on one part of one face) with said enamel.

The present invention also relates to a process for manufacturing an article, in particular a plate, according to the invention, wherein the above composition is applied, for example by screenprinting or enamel jet, to the precursor glass (or mother glass or green glass) article before ceramization, said composition being fired during the ceramization cycle and/or wherein the above composition is applied, for example by screenprinting or enamel jet, to the glass-ceramic article after ceramization, then said composition is fired.

The decoration obtained after firing of the enamel on the article according to the invention has an innovative functional and esthetic appearance that depends on the color of the substrate used and on its angle of observation; in particular, the article according to the invention has, in its area(s) coated by the selected enamel, a coloration in keeping with the color of the substrate (in particular an intense black area for a conventional black glass-ceramic substrate of intense black rendering), this coloring merging where appropriate (tone-on-tone effect) with the color of the plate under certain angles of observation (for example when observing at a distance from or perpendicular to the substrate), the selected enamel also offering at the same time, and under certain angles of observation, a contrast (of frosted effect or matt contrast type with respect to the shininess of the plate in particular and/or an impression of structuring with respect to the surface of the substrate) with the remainder of the plate making it possible to highlight and identify areas (for example control or display areas or boundaries of heating areas or logos) or to mask, where appropriate, defects of the plate.

The coating obtained thus has an unusual rendering for enamels while exhibiting the advantages of enamels; it may be fired during the ceramization and may withstand high temperatures making the use thereof possible with various heating means that may be added to the substrate according to the invention. Moreover, it is suitable both for conventional glass-ceramics refined with arsenic and for glass-ceramics refined without arsenic, the effect and the advantages obtained being the same in both cases. It is thus suited to any type of glass-ceramic, and has a good mechanical strength in all cases. Other advantages will also appear in the remainder of the description.

Preferably, the glass-ceramic article according to the invention is a glass-ceramic plate, intended for example to cover or receive at least one heating element, in particular intended to be used as a hotplate or wall (in particular door or door part) for ovens or fireplace insert or else fire screen.

The article according to the invention may be based on an arsenic-refined glass-ceramic (i.e. having (a mother glass with) a composition comprising of the order of 0.5% to 1.5% by weight of arsenic oxide, or even having a composition comprising between 0.2% and 0.5% by weight of arsenic oxide), or may be based on a glass-ceramic not refined with arsenic (in particular having a content of arsenic oxides (expressed as $As_2O_3$) of less than 0.2%, in particular of less than 0.1%, in particular less than or equal to 500 ppm, or even zero).

The article according to the invention is advantageously based on a glass-ceramic of black appearance, for example based on a black glass-ceramic having low light transmission, of less than 5% (such as the plates sold under the name Kerablack+ by Eurokera) coated with the layer of enamel according to the invention. In particular, it may be an arsenic-refined glass-ceramic having a composition as described in patent application EP 0437228 or U.S. Pat. No. 5,070,045 or FR 2657079, or advantageously a glass-ceramic having a content of arsenic oxides (expressed as $As_2O_3$) of less than 0.2% (or even of less than 0.1%, or even less than or equal to 500 ppm, or even zero), for example having a composition as described in patent application WO 2012/156444 (these glass-ceramics being of black appearance, having a low light transmission, in particular of less than 5%, preferably between 0.8% and 2%, and being refined with tin).

The article according to the invention may also be of light color, based on a transparent glass-ceramic (such as the plates sold under the name KeraLite by Eurokera and Keraglass) or a translucent glass-ceramic (such as the plates sold under the name Kerawhite, KeraWhite TC, Kerabiscuit or Keravanilla by Eurokera), coated with the layer of enamel according to the invention.

The composition of the enamel according to the invention defined above will now be more specifically explained hereinbelow. In this composition, the domains defined for each of the components are paramount for obtaining the desired properties and appearances. Respect for the domains of the composition also make it possible to guarantee the production of the frit at high temperature, the desired mechanical strength and the chemical durability, etc.

This enamel composition has a refractive index close to that of the glass-ceramics on which it is deposited, the difference between the two indices (that of the glass-ceramic and that of the enamel obtained by firing preferably being less than 0.05 (as an absolute value) and in particular less than 0.02 in order in particular to obtain the desired rendering. The frit of the enamel composition also has a low softening point, in particular of less than 800° C. enabling good coverage of the enamel on the surface of the glass-ceramic during the ceramization (at temperatures generally between 900° C. and 1000° C.). In particular, the $B_2O_3$ content in the composition of the frit/enamel makes it possible in particular to achieve the desired softening point while preventing undesirable iridescence effects that may occur at a high content, this compound also having a low impact on the refractive index, the $K_2O$ content also helping to reduce the softening point of the frit, with a $TiO_2$ content that is simultaneously limited so as, in particular, to prevent the appearance of blueish hues.

Besides the constituents mentioned above, the composition of the frit may, where appropriate, contain other constituents (for example SrO, $Fe_2O_3$, etc., in particular in the form of trace amounts linked to the degree of purity of the raw materials) in a limited amount (for example of less than 0.1%, or even of less than 0.05% in particular for $Fe_2O_3$) as long as these constituents do not compromise the desired properties, the composition also advantageously being free of toxic metals such as lead, mercury, cadmium and hexavalent chromium.

Besides the glass frit (or glass particles) having the composition explained previously, the enamel according to the invention may also comprise other components. Remember that enamels are generally formed (before application to the substrate and firing) from a powder comprising a glass frit (that has to form the glassy matrix) and pigments (as colorants in particular), the frit and pigments being based on metal oxides, and on a medium or "carrier" allowing the application and the prior adhesion of the enamel to a substrate, this medium being intended to be eliminated at the latest during the firing of the enamel.

The enamel may thus comprise pigments, these pigments possibly being chosen from compounds containing metal oxides such as chromium oxides, copper oxides, iron oxides, cobalt oxides, nickel oxides, manganese oxides, cerium oxides, etc. For example, it is possible to add to the frit a black pigment formed from a mixture of iron, chromium, cobalt and nickel oxides (Co—Cr—Fe—Mi spinels, such as the one sold by Ferro under the reference 240137), or formed from a mixture of chromium and copper oxides (Cr—Cu spinels), or based on $MnO_2$, $Fe_2O_3$ and/or CoO, etc.

Advantageously however, the enamel according to the invention is generally formed from the glass frit alone (besides the medium initially present where appropriate), that is to say without the addition of pigments. In other words, the enamel according to the invention is generally and advantageously devoid of pigments (added to the frit), this addition of pigments to the frit being superfluous, or even detrimental to the objective desired in the present invention. In the event of addition of pigments to the frit, the content of said pigments is preferably less than 5% by weight of all of the frit(s)/pigment(s) of the enamel, in order in particular not to generate an unwanted hue.

The glass frit (and the optional pigments) is (are) generally in powder form before being suspended in a medium. The particle size distribution of the frit (and of the optional pigments) in powder form is preferably chosen so that at least 90% by weight of the particles forming the powder have a diameter of less than 15 µm (i.e. so that (the particles of) the frit and optional pigments present has (have) a D90 of less than 15 µm) for example of the order of 9-14 µm, or even a smaller diameter, in particular of less than 4 µm).

The frit of the composition according to the invention is conventionally obtained by melting, at high temperature (more than 1000° C.) a mixture of suitable (natural or synthetic) raw materials. The frit is then milled (generally in a solvent, such as ethanol, that is then evaporated) in powder form, and if necessary pigments are added (before and/or after the milling operation(s)). The pulverulent mixture obtained (and having, after the milling operation(s) and/or other appropriate treatment(s), particles having a mean diameter D90 of less than 15 µm) is, after evaporation if necessary of the milling solvent, subsequently suspended in a medium in order to obtain a composition (paste) capable of being deposited onto a substrate.

The enamel composition according to the invention, in its ready-to-deposit form, thus generally also comprises a medium allowing adjustment to the viscosity desired for application to the substrate and enabling binding with the substrate. This medium, chosen in order to ensure good suspension of the particles of frits and optional pigments and that must be consumed at the latest during the firing of the enamel, may be any medium or organic binder customarily used in conventional enamel compositions and may in particular comprise solvents, diluents, oils such as pine oil and other plant oils, resins such as acrylic resins, petroleum fractions, film-forming substances such as cellulose substances, etc. The proportion of medium in the ready-to-deposit composition is preferably between 40% and 60% by weight of said composition, preferably between 45% and 55% by weight.

The enamel composition before deposition onto an article, such as a plate, is therefore generally in the form of a stable liquid-solid mixture, of pasty consistency, with a viscosity suitable for the deposition process (in particular by screen printing).

The layer of enamel deposited on the article or substrate, in particular the plate, according to the invention, covers one or more areas of the surface of the plate (generally on its upper or visible face in the case of a plate, in particular a hotplate) and enables a contrast with the non-covered parts of the plate as explained above.

The lightness $L^*$ of the enamel is close to that of the glass-ceramic on which it is deposited due in particular to the transparency of the enamel, the difference between the lightness values (that of the glass-ceramic and that of the enamel obtained by firing) preferably being less than 1 (as an absolute value) in order in particular to obtain the desired rendering giving in particular the impression that the surface of the glass-ceramic is structured, the enamel and the glass-ceramic appearing to be made of one and the same material. The colorimetric coordinates $L^*$, $a^*$, and $b^*$ in reflection are measured using a colorimeter sold by X-rite under the reference X-rite Color i7.

Moreover, the brightness B of the enamel defined according to the invention is higher than that of a standard enamel incorporating a higher content of pigments (for example of the order of 30%), this brightness being in particular greater than 50, preferably greater than 60, and increasing with the highest contents of $Al_2O_3$ and/or $B_2O_3$. The brightness is measured under an angle of 0° (the illumination being produced at 45°) with a machine sold by Byk under the reference Byk Spectro Guide (the brightness range that can be measured being between 0 and 100, 100 being obtained with a black standard sold by Byk under the reference 6840).

The thickness of the enamel layer after firing (whether the firing is carried out during the ceramization after deposition on precursor glass, or is carried out subsequently after deposition on the glass-ceramic, as explained later on) is preferably from 2 μm to 4 μm, in particular from 2 μm to 3 μm for example of the order of 2.5 μm, the thickness of the glass-ceramic being, for example, of the order of 3-4 mm in the case of a hotplate.

As indicated above, the coating obtained has the advantages of enamels while making possible, on a glass-ceramic substrate, a coloration that is intense and/or matched with the substrate and that withstands the firing (for example an intense black coloration on a black glass-ceramic substrate or a translucent and/or frosted appearance that is tinted very little on a white glass-ceramic substrate) and, depending on the angle of observation, a contrast effect with respect to the remainder of the substrate possibly highlighting particular areas or providing a particular esthetic effect and/or masking defects of the substrate.

The enamel chosen according to the invention and the article coated with this enamel also have good thermal resistance that is compatible with the use of various types of heaters, are scratch and abrasion resistant and resistant to heat shocks, have good aging resistance and sufficient mechanical strength. From the process standpoint, the composition deposited does not differ from a conventional enamel and is completely compatible with existing production lines, in particular, it may be applied by screen printing using standard screen printing machines and fabrics. Compared with the thin layers deposited by magnetron sputtering, it is more economical and, being electrically insulating, it may be used, with no particular adjustment, with touch-sensitive controls, usually capacitive touch-sensitive controls. It is also compatible with all types of heating (in particular it withstands high temperatures, and is suitable for the magnetic fields of induction coils, etc.), unlike magnetron-sputtered paints and, where appropriate, layers generally reserved for certain types of heating. It may also be deposited in any area of the plate, where appropriate.

As already mentioned, the present invention also relates to the process for manufacturing articles, in particular plates, according to the invention, in which the enamel composition according to the invention is applied, preferably by screen printing, to the article of precursor glass (or mother glass or green glass) before ceramization, said composition being fired during the ceramization cycle and/or in which said composition is applied, preferably by screen printing, to the glass-ceramic article after ceramization, then said composition is fired.

When the firing of the enamel is carried out subsequently (after ceramization, this procedure also being known as a process with refiring), said firing can in particular be carried out at a temperature chosen, for example, from the temperature range within which good coverage with the enamel is observed, this temperature range lying in particular between 700 and 900° C. for the enamels according to the invention, this temperature where appropriate being around 250° C. to 300° C. higher with respect to the dilatometric softening point of the enamel (or more precisely of the glass/of the glass frit forming the enamel).

As a reminder, the manufacture of glass-ceramic plates generally takes place as follows: the glass, having a composition chosen for forming the glass-ceramic, is melted in a melting furnace, the molten glass is then rolled into a standard ribbon or sheet, by making the molten glass pass between rolling rolls, and the glass ribbon is cut to the desired dimensions. The plates thus cut are then ceramized in a manner known per se, the ceramization consisting in firing the plates with the thermal profile chosen to convert the glass into the polycrystalline material called "glass-ceramic", the expansion coefficient of which is zero or almost zero and which is resistant to a heat shock possibly ranging up to 700° C.

The ceramization generally comprises a step of progressively raising the temperature up to the nucleation range, generally located in proximity to the glass conversion range, a step of passing through the nucleation range over several minutes, a further progressive rise in the temperature up to the ceramization hold temperature, the ceramization hold temperature being maintained for several minutes, followed by rapid cooling down to room temperature. Where appropriate, the process also includes a cutting operation (generally before ceramization), for example using a water jet, mechanical scoring using a scoring wheel, etc., followed by a shaping operation (grinding, beveling, etc.).

In the process according to the invention, the composition described previously is deposited, either onto the glass precursor article or onto the glass-ceramic article obtained after ceramization, generally in the form of a paste, the deposition of the layer of composition preferably being carried out by screen printing (the deposition nevertheless being able to be carried out by another method if necessary), the thickness of the layer deposited (or wet film) being, for example, around a few microns (in particular less than or equal to 8 μm, and generally less than or equal to 6 μm). After depositing the composition, the coated article is generally dried (for example, via infrared heating or in an oven), generally at temperatures around 100-150° C., so as to evaporate the solvent (medium), fix the coating and allow the article to be handled, which results in a dry coating, then depending on the case, undergoes a conventional high-temperature ceramization cycle (especially as mentioned previously), the firing of the layer accompanying the conversion of the substrate, or undergoes a (re)firing at a temperature that enables a good coverage with the enamel as explained above, the firing time being adapted as a function of the chosen temperature (for example, longer if the temperature chosen is lower), the coating obtained then having a thickness generally of around a few microns (generally between 2 and 4 μm, in particular from 2 to 3 μm).

When the article according to the invention is a plate, said plate may, where appropriate, comprise reliefs and/or hollows and/or it may be provided (or associated) with one or more additional functional or decorative elements (frame, connector(s), cable(s), control element(s), display(s), for example what are referred to as "7-segment" light-emitting diode displays or liquid crystal displays, electronic control panel with touch-sensitive controls and digital display, etc.). The plate according to the invention may be mounted on an appliance, inside which the one or more heating elements are placed, where appropriate without an intermediate complex that aims to mask the interior of the apparatus from the user's view.

The invention also relates to the appliances (or devices) for cooking and/or for maintaining at high temperature that include at least one substrate (such as a plate or door) according to the invention (for example cookers, built-in cooktops, ovens, etc.). The invention covers both cooking appliances having a single plate and appliances having several plates, each of these plates having, where appropriate, a single heater or multiple heaters. The term "heater" is understood to mean a cooking location. The invention also relates to hybrid cooking appliances, the hotplate(s) of which has (have) several types of heater. Furthermore, the invention is not limited to the manufacture of hotplates for cookers or cooktops. The plates manufactured according to the invention may also be, as specified above, other plates (fireplace inserts, fire screens, etc.) that have to be very insensitive to temperature variations.

The examples which follow illustrate the results obtained with the glass-ceramic articles and enamels according to the present invention (examples 1 to 4) in comparison with a reference example relating to different prior glass-ceramic articles and enamels.

In these examples, a glass-ceramic plate, one face of which is smooth (that which must receive the enamel layer in the form of millimetric random patterns) and the other face of which has evenly distributed spikes (with a height of 40-120 μm and an elliptical circumference of 1.65/1.5 mm), is manufactured from a glass, not refined with arsenic, having a composition according to application WO 2012/156444.

This glass is melted at around 1600-1750° C. in an amount such that a glass ribbon is able to be rolled, from which ribbon glass plates with final dimensions of 50 cm×60 cm×0.4 cm are cut.

The plates are coated by screen printing on a portion of their upper face with a composition, in the form of a screen-printable stable enamel (based on a powder having the composition specified in each example, the powder being made into a paste in a medium based on acrylic resin and on pine oil sold under the reference MX54 by Ferro for the purpose of depositing it onto the plate, and said medium being consumed at the latest during the firing of the enamel) using conventional polyester or polyamide fabrics, then dried at around 100-150° C.

The plates (green glass or mother glass) coated with enamel are then ceramized on ceramic trays according to a cycle as described in patent application WO 2012/156444 (glass-ceramics not refined with arsenic/glass-ceramics refined with tin).

Glass-ceramic plates coated with a layer of enamel over one portion are obtained, the thickness of the layer of enamel after firing being around 2-3 μm. The uncoated portion of the plate is of black color and has the following L*, a*, and b* colorimetric coordinates: L*=24.65, a*=0.5 and b*=−0.1. Its brightness B is 90.9.

REFERENCE EXAMPLE

In this reference example, the enamel used is a conventional enamel based on a powder comprising 100% by weight of a glass frit having the following composition: $SiO_2$: 54%; $Al_2O_3$: 16.8%; $B_2O_3$: 17.9%; $Li_2O$: 2.85%; $Na_2O$: 0.5%; $K_2O$: 0.2%; CaO: 0.5%; MgO: 0.3%; ZnO: 1.3%; BaO: 2.1%; $ZrO_2$: 1.1%; $TiO_2$: 2.5%. The particles of the frit have a D90 of 11.4 and the difference between the refractive index of the glass-ceramic and that of the enamel is 0.057 as an absolute value, the refractive indices being considered at a wavelength of 590 nm. The enamelled coating obtained after firing during the ceramization is black with a blueish hue and has the following L*, a*, and b* colorimetric coordinates: L*=27.4, a*=0.38 and b*=−1.97 (characteristic value of a blueish rendering). This coating is moreover not very bright, the brightness being 47.

Example 1

In this first example according to the invention, the enamel used is an enamel based on a powder comprising 100% by weight of a glass frit having the following composition: $SiO_2$: 48.3%; $Al_2O_3$: 20.9%; $B_2O_3$: 17.5%; $Li_2O$: 2.7%; $Na_2O$: 0.6%; $K_2O$: 3.0%; CaO: 1.1%; MgO: 1.7%; ZnO: 1.5%; BaO: 1.8%; $ZrO_2$: 0.7%; $TiO_2$: 0.3%. The particles of the frit have a D90 of 10.1 μm approximately and the difference between the refractive index of the glass-ceramic and that of the enamel is less than 0.02 as an absolute value, the refractive indices being considered at a wavelength of 590 nm. The enamelled coating obtained after firing is intense black and has the following L*, a*, and b* colorimetric coordinates: L*=25.12 (close to the lightness of the plate), a*=0.39 (close to that of the glass-ceramic) and b*=−0.31 (close to that of the glass-ceramic). This enamel is moreover brighter than a conventional enamel, its brightness being 69.7. The enamel has an appearance that is merged with the glass-ceramic plate on which it is deposited or a contrast with respect to the remainder of the plate depending on the angle of observation.

Example 2

In this second example according to the invention, the enamel used is an enamel based on a powder comprising 100% by weight of a glass frit having the following composition: $SiO_2$: 47.6%; $Al_2O_3$: 17.2%; $B_2O_3$: 21.6%; $Li_2O$: 2.9%; $Na_2O$: 0.5%; $K_2O$: 3.0%; CaO: 1.2%; MgO: 1.7%; ZnO: 1.6%; BaO: 1.8%; $ZrO_2$: 0.7%; $TiO_2$: 0.3%. The particles of the frit have a D90 of 10.1 μm approximately and the difference between the refractive index of the glass-ceramic and that of the enamel is less than 0.02 as an absolute value, the refractive indices being considered at a wavelength of 590 nm. The enamelled coating obtained after firing is intense black and has the following L*, a*, and b* colorimetric coordinates: L*=24.81 (very close to the lightness of the plate), a*=0.59 (very close to that of the glass-ceramic) and b*=−0.07 (very close to that of the glass-ceramic). This enamel is moreover much brighter than a conventional enamel, its brightness being 79.7. The enamel has an appearance that is merged with the glass-ceramic plate on which it is deposited or a contrast with respect to the remainder of the plate depending on the angle of observation.

Example 3

In this example according to the invention, the enamel used is an enamel based on a powder comprising 100% by weight of a glass frit having the following composition: $SiO_2$: 55%; $Al_2O_3$: 17.1%; $B_2O_3$: 17.1%; $Li_2O$: 2.8%; $Na_2O$: 0.5%; $K_2O$: 2.3%; CaO: 0.5%; MgO: 0.3%; ZnO: 1.3%; BaO: 2.2%; $ZrO_2$: 1.1%. The particles of the frit have a D90 of 11.8 μm and the difference between the refractive index of the glass-ceramic and that of the enamel is 0.017 as an absolute value, the refractive indices being considered at a wavelength of 590 nm. The enamelled coating obtained after firing is intense black and has the following L*, a*, and b* colorimetric coordinates: L*=24.47 (very close to the lightness of the plate), a*=0.56 (very close to that of the glass-ceramic) and b*=−0.48 (very close to that of the glass-ceramic). This enamel is moreover brighter than a conventional enamel, its brightness being 66.4. The enamel has an appearance that is merged with the glass-ceramic plate on which it is deposited or a contrast with respect to the remainder of the plate depending on the angle of observation. In particular, if it is deposited on the plate in the form of parallel lines having a thickness of 0.5-0.6 mm and spaced 0.8-0.9 mm apart from one another, the observer distinguishes, depending on the distance at which he is placed, the lines and/or a matt area with respect to the uncoated areas or a unified appearance. This enamel is particularly advantageous since it also allows better coverage of the glass-ceramic than the enamel from example 1 and it has a better chemical resistance than the enamel according to example 2.

Example 4

In this example according to the invention, the enamel used is an enamel based on a powder comprising 100% by weight of a glass frit having the following composition: $SiO_2$: 51.9%; $Al_2O_3$: 17%; $B_2O_3$: 17.7%; $Li_2O$: 2.7%; $Na_2O$: 0.6%; $K_2O$: 3%; CaO: 1.1%; MgO: 1.7%; ZnO: 1.5%; BaO: 1.8%; $ZrO_2$: 0.7%; $TiO_2$: 0.3%. The particles of the frit have a D90 of 11.5 µm and the difference between the refractive index of the glass-ceramic and that of the enamel is less than 0.02 as an absolute value, the refractive indices being considered at a wavelength of 590 nm. The enamelled coating obtained after firing is intense black and has the following L*, a*, and b* colorimetric coordinates: L*=24.35 (very close to the lightness of the plate), a*=0.48 (very close to that of the glass-ceramic) and b*=−0.34 (very close to that of the glass-ceramic). This enamel is moreover brighter than a conventional enamel, its brightness being 62.1. The enamel has an appearance that is merged with the glass-ceramic plate on which it is deposited or a contrast with respect to the remainder of the plate depending on the angle of observation. This enamel is particularly advantageous since it also allows better coverage of the glass-ceramic than the enamel from example 1 and it has a better chemical resistance than the enamel according to example 2.

The plates according to the invention may especially be used advantageously to produce a new range of hotplates for cookers or cooktops, or for producing elements of a wall or walls (for example doors) for ovens, or for producing fireplace inserts or fire screens, etc.

The invention claimed is:

1. A glass-ceramic article, at least partly coated with at least one layer of an enamel formed from a glass frit having the following composition, the proportions being expressed as weight percentages:
   $SiO_2$ 45-60%,
   $Al_2O_3$ 12-22%,
   $B_2O_3$ 12-22%,
   $Li_2O$ 0-5%,
   $Na_2O$ 0-2%
   $K_2O$ >2%
   CaO 0-4%,
   MgO 0-4%,
   ZnO 0-4%,
   BaO 0-4%,
   $ZrO_2$ 0-4%,
   $TiO_2$ 0-1%,
   the sum of the oxides CaO + MgO + BaO + SrO + ZnO moreover being less than or equal to 10%,
   wherein the enamel provides an appearance that is merged with the glass-ceramic article on which it is coated or a contrast with respect to the remainder of the article depending on an angle of observation.

2. The glass-ceramic article as claimed in claim 1, wherein the enamel comprises a pigment content of less than 5% by weight.

3. The glass-ceramic article of claim 1, wherein the difference between the refractive index of the enamel and that of the glass-ceramic is less than 0.05.

4. The glass-ceramic article of claim 1, having a softening point of less than 800° C.

5. The glass-ceramic article of claim 1, wherein the difference between the lightness of the enamel and that of the glass-ceramic is less than 1.

6. The glass-ceramic article of claim 1, wherein the brightness B of the enamel is greater than 50.

7. The glass-ceramic article of claim 1, wherein the particle size distribution of the frit, and of optional pigments, in powder form is such that at least 90% by weight of the particles forming the powder have a diameter of less than 15 µm.

8. The glass-ceramic article of claim 1, wherein the thickness of the enamel layer is from 2 µm to 4 µm.

9. The glass-ceramic article of claim 1, wherein the article is formed from a glass-ceramic comprising less than 0.2% by weight of arsenic oxides.

10. The glass-ceramic article as claimed in claim 1, wherein the enamel is devoid of pigment.

11. The glass-ceramic article of claim 1, wherein the difference between the refractive index of the enamel and that of the glass-ceramic is less than 0.02.

12. The glass-ceramic article of claim 1, wherein the brightness B of the enamel is greater than 60.

13. The glass-ceramic article of claim 1, wherein the particle size distribution of the frit, and of the optional pigments, in powder form is such that at least 90% by weight of the particles forming the powder have a diameter of less than 4 µm.

14. The glass-ceramic article as claimed in claim 1, wherein:
   the difference between the lightness of the enamel and that of the glass-ceramic is less than 1;
   the difference between the refractive index of the enamel and that of the glass-ceramic is less than 0.02;
   the particle size distribution of the frit, and of optional pigments, in powder form is such that at least 90% by weight of the particles forming the powder have a diameter of 9-14 µm.

15. The glass-ceramic article of claim 14, wherein the article is formed from a glass-ceramic comprising less than 0.2% by weight of arsenic oxides.

16. The glass-ceramic article of claim 14, wherein the enamel is devoid of pigment.

17. The glass-ceramic article of claim 15, wherein the enamel is devoid of pigment.

* * * * *